Patented Dec. 29, 1953

2,664,445

UNITED STATES PATENT OFFICE 2,664,445

STABILIZED AROMATIC AMINES

Adrian L. Linch, Wilmington, Del., assignor to E. I. du Pont de Nemours & Company, Wilmington, Del., a corporation of Delaware No Drawing. Application February 28, 1950, Serial No. 146,934

9 Claims. (Cl. 260—574)

This invention relates to aromatic amines which have been stabilized against atmospheric oxidation, particularly by having incorporated therein small proportions of a new class of antioxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. For example, xylidine will oxidize in 2 to 3 weeks under normal storage conditions to a point which renders it unsuitable for use in azo colors, and para-toluidine oxidizes to a deep red color in 2 to 3 days when stored in the liquid state at 60° C. to 80° C. In practice, such oxidation has been largely avoided by consuming the amines within a few days of their production or the amines have been purified, by distillation or crystallization, just prior to their use. In some cases, the loss of unstabilized amine, such as alphanaphthylamine, has been as high as 1% per week and the accumulated oxidation products have adversely affected the yield of substances prepared therefrom, such as azo dyes, by as much as 20%.

In industrial practice, the close scheduling of the production of the amines with the processes in which the amines are consumed has become increasingly less practical. The storage of amines, which deteriorate so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines, that is, they act as pro-oxygenic catalysts. Also, most metal deactivating agents actually increase the susceptibility of the aromatic amines to attack by atmospheric oxygen.

It has been proposed to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

It is an object of my invention to provide a class of aromatic amines containing a new class of compounds which are effective to inhibit oxidation of the amines. Another object is to provide a class of aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in an aromatic amine which is devoid of acid groups from about 0.01% to about 0.5% by weight of an aliphatic thioamide containing 1 to 2 thioamide groups of the formula

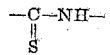

and otherwise consisting of carbon and hydrogen. Thereby, such aromatic amines are effectively stabilized against atmospheric oxidation.

I have found that such thioamides are efficient anti-oxidants for such aromatic amines. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such thioamides are also effective to protect the amines in the processes by which they are manufactured so that higher yields of amine of better quality can be obtained.

The aromatic amines, which may be effectively stabilized by my thioamides, are those which are devoid of acid groups, such as carboxyl, sulfate and sulfonic acid groups, including their salts and esters. Preferably, the aromatic amines will contain only 1 to 2 benzene rings, particularly only 1 benzene ring. Also, preferably, the aromatic amines will contain only 1 to 2 amino groups, unsubstituted or substituted by aryl or alkyl groups. Representative amines of this class are aniline, toluidines, xylidines, phenylene diamines, toluylene diamines, diphenylamines, ditolylamines, aminodiphenylamines, naphthylamines, N-alkyl-aminophenols and chlorinated derivatives of such amines, such as the chloroaminotoluenes.

The thioamides of my invention are the aliphatic thioamides which contain from 1 to 2 thioamide groups of the formula $$-\underset{\underset{S}{\|}}{C}-NH-$$

and otherwise consist of carbon and hydrogen and include both the acyclic thioamides and the cyclic thioamides. The cyclic thioamides have the formula $$\underset{NH}{\overset{R-\!\!-\!\!-C=S}{|\_\_\_\_\_|}}$$

wherein R represents a divalent aliphatic radical consisting of carbon and hydrogen, and are commonly known as thiolactams. The acyclic thioamides containing only one thioamide group (the mono-thioamides) have the formula $$R-\underset{\underset{S}{\|}}{C}-NH-R'$$

wherein at least one of R and R' represents an aliphatic hydrocarbon radical and the other represents hydrogen or an aliphatic hydrocarbon radical. The acyclic thioamides containing two thioamide groups (the di-thioamides) have the formula $$R-NH-\underset{\underset{S}{\|}}{C}-A-\underset{\underset{S}{\|}}{C}-NH-R$$

wherein R represents hydrogen or an aliphatic hydrocarbon radical and A is a divalent aliphatic hydrocarbon radical or is absent, in which latter case the carbons of the 2 thioamide groups are bonded to each other as in dithio-oxamide. The most effective and preferred thioamides are those which contain only 1 thioamide group, including the cyclic thioamides or lactams.

Representative thioamides of my invention, which are effective anti-oxidants for the aromatic amines, are:

| | |
|---|---|
| Thioacetamide | $CH_3-CS-NH_2$ |
| n-Butyl thioformamide | $H-CS-NH-C_4H_9$ |
| N-isobutyl thiocaprylamide | $C_7H_{15}-CS-NH-C_4H_9$ |
| N-amyl thiobutyramide | $C_3H_7-CS-NH-C_5H_{11}$ |
| Dithio oxamide | $NH_2-CS-CS-NH_2$ |
| Dithio adipamide | $NH_2-CS-(CH_2)_4-CS-NH_2$ |
| Thiovalerolactam | 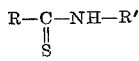 |
| Thiocaprolactum | 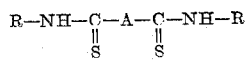 |

The concentration of the thioamide in the amine should be from about 0.01% to about 0.5% by weight, preferably, from about 0.02% to about 0.3%, and usually about 0.1%. While the thioamides may be effective in concentrations above 0.5%, such higher concentrations will generally be objectionable as they would contaminate the amine to an undesirable extent. Also, concentrations below 0.01% of thioamide will usually show some effect, but such effect will generally be insufficient for practical purposes.

Not all of the thioamides of my invention are equally effective for all of the aromatic amines of my invention. Accordingly, the particular thioamide and the concentration employed for each of the aromatic amines will be chosen in accord with the degree of stability desired. Also, the choice of thioamide and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the thioamide. Furthermore, the rate of oxidation of the aromatic amine increases with increase in temperature, so that the concentration of thioamide should be increased when the amine is to be subjected to temperatures above atmospheric. Furthermore, the rate of oxidation of the aromatic amine varies with variation in the extent of its exposure to air or oxygen and higher concentrations of thioamide will be required when the amine is to be exposed to air to any material extent. Therefore, it will be understood that the thioamides exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the thioamide to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the thioamide. However, the application of my invention is not restricted to freshly prepared amines, as the thioamide may be added to an aromatic amine which has been partially oxidized, and the thioamide will effectively retard further oxidation of the amine. Also, the thioamide may be added during the manufacture of the amine to avoid atmospheric oxidation during such manufacture, to thereby obtain the amine in higher yields and better quality. In particular, the thioamide may be added to the crude amine, before purification of the amine by crystallization, to thereby inhibit oxidation of the amine during the drying operation.

If the aromatic amine is liquid at normal temperatures, the thioamide may be simply added thereto in the desired concentration and dissolved therein. If the amine is a solid at atmospheric temperatures, it may be melted or dissolved in an inert solvent and the thioamide added to the melted amine or to the solution. Also, if the thioamide is not soluble in a particular aromatic amine to the extent desired, it may be added as a solution in a suitable solvent. The thioamides effectively stabilize the aromatic amines in the presence of inert solvents and diluents.

Examples are given hereinafter, illustrating the effect of representative thioamides in stabilizing representative aromatic amines. The tests with liquid aromatic amines were carried out in clear glass bottles filled to approximately 75% of their capacity with the amine or stabilized amine and exposed to diffused daylight at room temperature. The bottles were capped but not sealed airtight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford photelometer, using blue (central maximum=410 mu), green (525 mu) and red (610 mu) filters, as well as total absorption with no filter. Distilled water was used as the reference standard, and the density expressed as percent transmission. Experience has shown that the use of aromatic amines, darker than a red-amber color, in chemical processes does not produce satisfactory results. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes variations in oxidation susceptibility exhibited by individual production lots of the amine.

Evaluation of those amines, which are normally solid at room temperature, was carried out somewhat differently. The inhibitor was dissolved in the amine at a temperature sufficiently high to maintain a liquid state. In some cases, the test was then conducted at that temperature. In other cases, the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no inhibitor, was tested at the same time, personal variations in judgment of color depth largely cancelled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine was calculated by dividing the index of the stabilized amine by the index of the unstabilized amine (control index). This ratio is given in the examples as the "Stability ratio." This stability ratio expresses the relation of the storage life of the stabilized amine to the storage life of the unstabilized amine under the same conditions. For example, a stability ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

EXAMPLE I

*Aniline*

Reagent grade aniline was redistilled under reduced pressure to remove colored oxidation products and obtain a water white product for testing. The following table summarizes the results from stability evaluations conducted at room temperature.

[Control index (unstabilized)=408.]

| Anti-oxidant | Concentration, percent | Anti-oxidant index | Stability ratio |
|---|---|---|---|
| 1. Thiovalerolactam | 0.1 | 210 | 1.51 |
| 2. Thiocaprolactam | 0.1 | 310 | 1.76 |
| 3. N-n-butyl thioformamide | 0.1 | 340 | 1.83 |
| 4. N-isobutyl thiocaprylamide | 0.1 | 210 | 1.51 |

EXAMPLE II

*Ortho toluidine*

The amine to be stabilized was a commercial grade of ortho toluidine which distilled from 5 cc. to 95 cc. over a range of 1.0° C. including 200.2° C., contained not less than 99.0% total toluidine by diazotization, and was completely soluble in 10% hydrochloric acid. The ortho toluidine was re-distilled at 20 mm. pressure to separate it from colored, non-volatile impurities and to obtain a colorless product. The following table summarizes the results obtained from stability tests made at room temperature.

[Control index (unstabilized o-toluidine)=210.]

| Anti-oxidant | Concentration, percent | Anti-oxidant index | Stability ratio |
|---|---|---|---|
| 1. N-n-butyl thioformamide | 0.1 | 390 | 2.86 |
| 2. N-isobutyl thiocaprylamide | 0.1 | 290 | 2.38 |
| 3. Gamma-thiovalerolactam | 0.1 | 450 | 3.14 |
| 4. Thiocaprolactam | 0.1 | 1,060 | 6.05 |
|  | 0.02 | 390 | 2.86 |
| 5. Dithioadipamide | 0.01 | 290 | 2.38 |
|  | 0.1 | 480 | 3.29 |

EXAMPLE III

*Meta toluidine*

A commercial grade of meta toluidine initially distilled over a range of 1.0° C. from 5 cc. to 95 cc. including 203.3° C., contained not less than 98% meta toluidine by diazotization in the presence of HBr, and was completely soluble in 10% HCl. Such meta toluidine was redistilled to obtain a water white product for stability evaluation. The following table summarizes the results obtained from stability tests made at room temperature.

[Control index (unstabilized meta toluidine) =190.]

| Anti-oxidant | Concentration, percent | Anti-oxidant index | Stability ratio |
|---|---|---|---|
| 1. Thiocaprolactam | 0.1 | 160 | 1.84 |
| 2. N-n-butyl thioformamide | 0.1 | 380 | 3.0 |
| 3. Dithio adipamide | 0.1 | 130 | 1.68 |

EXAMPLE IV

Para toluidine

Commercial quality para toulidine, which has a freezing point above 43.0° C., and was completely soluble in 10% HCl, was distilled under reduced pressure to obtain a water white product. The tests for oxidation rate were carried out in open bottles in an air oven at 70°±2° C. to simulate industrial plant storage conditions. The extent of decomposition was estimated by visual examination.

[Control index (unstabilized para toluidine) =8 (48 hours).]

| Anti-oxidant | Concentration, percent | Anti-oxidant index | Stability ratio |
|---|---|---|---|
| 1. Thioacetamide | 0.025 | 24 | 4.0 |
| 2. Thiocaprolactam | 0.1 | 28 | 4.5 |
| 3. N-n-butyl thioformamide | 0.1 | 8 | 2.0 |

EXAMPLE V

Xylidines

The amine to be stabilized was a mixture of isomeric xylidines, obtained by reduction of nitro xylene isomers produced by nitration of 3° xylene, which contained more than 99.0% total amines calculated as xylidene, no material insoluble in 10% HCl, less than 0.15% nitro xylene as determined by titanous sulfate reduction, and distilled over the range 214.0° C. (first drop) to 223.0° C. (95% point) at 760 mm. This mixture was distilled under reduced pressure to obtain a water white product for the evaluation of anti-oxidants. The stability tests were made in clear glass in daylight at room temperature. The redistilled thioxylidines had an index of 70. When 0.1% of thiocaprolactam was incorporated therein, the stabilized xylidines had an index of 680, which gives an anti-oxidant index of 610 and a stability ratio of 9.7.

EXAMPLE VI

2-chloro-4-amino toluene

The commercial product crystallized at 21.2° C., had a nitrite absorption value above 96.0%, and contained more than 24.0% chlorine. It was distilled at 10 mm. pressure to obtain a water white 2-chloro-4-amino toluene for evaluation of response to anti-oxidants. The distilled amine had an index of 90. The addition of 0.1% of thiocaprolactam to the amine increased the index to 1500, which corresponds to an anti-oxidant index of 1410 and a stability ratio of 16.7.

EXAMPLE VII

4-chloro-2-amino toluene

A commercial grade product, containing more than 98% 4-chloro-2-amino toluene, was distilled at 20 mm. pressure to remove colored impurities. The following table summarizes the results collected from stability tests made at room temperature in daylight exposure.

[Control index (unstabilized aliquot) =250.]

| Anti-oxidant | Concentration, percent | Anti-oxidant index | Stability ratio |
|---|---|---|---|
| 1. Thioacetamide | 0.1 | 1,320 | 6.3 |
| 2. Thiocaprolactam | 0.1 | 810 | 4.2 |

EXAMPLE VIII

Diphenylamine

The utility of the thioamides is not limited to application in relatively pure aromatic amines, but can be applied to the preservation of such amines in mixtures with other materials. For example, diphenylamine, emulsified in a mixture containing 30% benzene, 40% water and sufficient colloidal clay to stabilize and thicken the emulsion, decomposed in a clear glass bottle exposed to direct sunlight to produce dark grey-blue oxidation products in 2 to 3 hours. The same formulation, made up with diphenylamine containing 0.25% thioacetamide, was exposed for five days before a red-brown discoloration appeared on the surface of the sample. Screening out part of the actinic light rays by conducting the tests in brown glass bottles increased the anti-oxidant effect to a level which permitted no color development over a period of two weeks direct sunlight exposure.

EXAMPLE IX

Toluylene diamine (2,4-diamino toluene)

A sample of toluylene diamine, which had a melting range 97.4–96.8° C., was distilled at 2-3 mm. pressure and 141–142° C. vapor temperature to obtain a colorless product for anti-oxidant evaluation. Thioacetamide was dissolved in the molten amine in a concentration of 0.3% at 98°–100° C., and the sample allowed to solidify in a clear glass bottle. The storage tests were conducted at normal laboratory room temperature in diffused daylight. Not only was color used as a criterion of oxidation progress, but the appearance of a black tar was considered as the useful limit of anti-oxidant life. The unstabilized amine had an index of about 4. The stabilized amine had an index of 224 which corresponds to an anti-oxidant index of 220 and a stability ratio of 56.

Similar results may be obtained by the addition of anti-oxidants selected from this class of thioamides to other freshly purified phenylene diamines such as meta phenylene diamine. For example, freshly distilled, commercial meta phenylene diamine crystallized at 62.85° C. and had an index of 4. The addition of 0.1% of thioacetamide resulted in an index of 20, an anti-oxidant index of 16 and a stability ratio of 5.

EXAMPLE X

4-amino diphenylamine

A sample of distilled para amino diphenylamine was taken from a plant still product receiver, and kept molten until aliquots could be removed for testing the activity of anti-oxidants. Although a blue-violet color had developed during the short exposure (less than an hour), the results of the evaluation were distinct. The crystallizing point of the initial sample was 69.8° C. The aliquots, after thorough mixing at 80–85°, were allowed to crystallize and the evaluation made at room temperature. The control (no inhibitor) froze to a pale pink solid, but, during a 24 hour storage period of exposure to light and air, developed a dark red-lavender color and the formation of a black tar, which wetted the sides of the sample bottle, was quite noticeable. In the presence of inhibitors, the suppression of oxidative decomposition to a similar end point is evaluated in terms of anti-oxidant index as follows:

[Control index=4.]

| Anti-oxidant | Concentration, percent | Anti-oxidant index | Stability ratio |
|---|---|---|---|
| 1. Thioacetamide | 0.1 | 196 | 50.0 |
| 2. Thiocaprolactam | 0.1 | 40 | 11.0 |

EXAMPLE XI

N-isobutyl para amino phenol

A commercial grade of N-isobutyl para amino phenol was distilled under reduced pressure (boiling point at 0.5 mm.=149° C.), and the distillate collected under nitrogen to prevent oxidation until the anti-oxidants could be dissolved in test aliquots. Two sets of evaluations, one in clear glass, open top glass bottles at room temperature exposed to daylight, the other in open top bottles at 50–60° C. in an oven, were carried out. Progress of the oxidation was estimated visually by the progress of color development, and appearance of tar (in the solid samples). When a sufficient concentration of oxidation products had accumulated to impart a dark grey-brown color, the isobutyl para amino phenol was considered unfit for commercial uses. The initial color of the distillate under nitrogen was a pale amber which, in the absence of an anti-oxidant, developed to a dark grey color in less than four days exposed to the atmosphere. When 0.1% of thioacetamide was added, the amine was stable for 90 days at room temperature and for 20 days at 50–60° C.

EXAMPLE XII

Alpha naphthylamine

Several batches of commercial alpha-naphthylamine, which crystallized at 46.0° C. to 46.1° C. (by maximum rise method) and contained 4.6% to 4.4% beta isomer, were redistilled at 1–2 mm. to obtain a colorless distillate which froze to a white, crystalline solid on cooling. The oxidative decomposition rates were determined in an air oven at 70°±2° C. in open glass bottles to simulate industrial plant storage conditions. The extent of decomposition was estimated by visual examination.

[Control index (unstabilized amine)=4.]

| Anti-oxidant | Concentration, percent | Initial crystallizing point | Anti-oxidant index | Stability ratio |
|---|---|---|---|---|
| 1. Thioacetamide | 0.1 | 46.0 | 16 | 5.0 |
|  | 0.25 | 46.1 | 32 | 9.0 |
| 2. Dithioadipamide | 0.20 | 46.1 | 28 | 8.0 |

It will be understood that the preceding examples are given solely for illustrative purposes and that I do not intend to limit my invention to the specific embodiments disclosed therein. It will be apparent to those skilled in the art that other aromatic amines within the class heretofore disclosed may be similarly stabilized. It will also be apparent that other thioamides within the class hereinbefore defined and mixtures of two or more thioamides may be substituted for those of the examples. It will be further apparent that the concentration of thioamide in the aromatic amine may be varied within the limits disclosed. Still further, the stabilized amine may be diluted with inert solvents or with inert liquid or solid diluents.

It will be apparent that by my invention, I am able to provide a class of aromatic amines which are effectively stabilized against oxidation for relatively long periods of time. Thereby, the amines may be stored without material loss in amine or contamination of the amine with deleterious oxidation products and it is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the benzene and naphthalene series which contains 1 to 2 benzene rings and 1 to 2 amino groups and which is devoid of acid groups and from about 0.01% to about 0.5% of a thioamide of the class consisting of thioamides having the formula

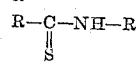

wherein one R is an alkyl radical containing 1 to 7 carbon atoms and the other R is selected from the class consisting of hydrogen and alkyl radicals containing 1 to 7 carbon atoms, thioamides having the formula

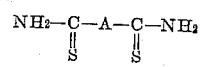

wherein A is a divalent saturated aliphatic hydrocarbon radical containing up to 4 carbon atoms, and cyclic thioamides having the formula

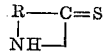

wherein R is a divalent saturated aliphatic hydrocarbon radical containing 3 to 5 carbon atoms.

2. A composition consisting essentially of an aromatic amine of the benzene and naphthalene series which contains 1 to 2 benzene rings and 1 to 2 amino groups and which is devoid of acid groups and from about 0.01% to about 0.5% of a thioamide of the formula

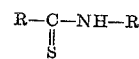

wherein one R is an alkyl radical containing 1 to 7 carbon atoms and the other is hydrogen.

3. A composition consisting essentially of an aromatic amine of the benzene and naphthalene series which contains 1 to 2 benzene rings and 1 to 2 amino groups and which is devoid of acid groups and from about 0.01% to about 0.5% of a thioamide of the formula

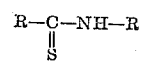

wherein each R is an alkyl radical containing 1 to 7 carbon atoms.

4. A composition consisting essentially of an aromatic amine of the benzene and naphthalene series which contains 1 to 2 benzene rings and 1 to 2 amino groups and which is devoid of acid groups and from about 0.01% to about 0.5% of a cyclic thioamide of the formula

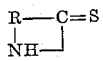

wherein R is a divalent saturated aliphatic hydrocarbon radical containing 3 to 5 carbon atoms.

5. A composition consisting essentially of an aromatic amine of the benzene and naphthalene series which contains 1 to 2 benzene rings and 1 to 2 amino groups and which is devoid of acid groups and from about 0.01% to about 0.5% of thioacetamide.

6. A composition consisting essentially of an aromatic amine of the benzene and naphthalene series which contains 1 to 2 benzene rings and 1 to 2 amino groups and which is devoid of acid groups and from about 0.01% to about 0.5% of thiocaprolactam.

7. A composition consisting essentially of an aromatic amine of the benzene and naphthalene series which contains 1 to 2 benzene rings and 1 to 2 amino groups and which is devoid of acid groups and from about 0.01% to about 0.5% of N-isobutyl thiocaprylamide.

8. A composition consisting essentially of an aromatic amine of the benzene and naphthalene series which contains 1 to 2 benzene rings and 1 to 2 amino groups and which is devoid of acid groups and from about 0.01% to about 0.5% of n-butyl thioformamide.

9. A composition consisting essentially of an aromatic amine of the benzene and naphthalene series which contains 1 to 2 benzene rings and 1 to 2 amino groups and which is devoid of acid groups and from about 0.01% to about 0.5% of dithio adipamide.

ADRIAN L. LINCH.

References Cited in the file of this patent

UNITED STATES PATENTS

| Number | Name | Date |
|---|---|---|
| 2,263,730 | Heutrich | Nov. 25, 1941 |
| 2,434,650 | Herbst | Jan. 20, 1948 |
| 2,434,651 | Robertson | Jan. 20, 1948 |
| 2,493,544 | Munday | Jan. 3, 1950 |

OTHER REFERENCES

Fieser et al., "Organ. Chem." (1944), p. 32.

Sidgwicks, "Organic Chem. of Nitrogen," New Ed. (1942), p. 522.

Conant, "The Chem. of Org. Cpds.," Rev. Ed. (1939), p. 323.